United States Patent [19]
Olds et al.

[11] Patent Number: 5,832,487
[45] Date of Patent: Nov. 3, 1998

[54] REPLICATED OBJECT IDENTIFICATION IN A PARTITIONED HIERARCHY

[75] Inventors: Dale R. Olds, Sandy; Layne Izatt, Orem; Ranjan Prasad, Sandy, all of Utah

[73] Assignee: Novell, Inc., Provo, Utah

[21] Appl. No.: 764,236

[22] Filed: Dec. 14, 1996

Related U.S. Application Data

[63] Continuation-in-part of Ser. No. 357,466, Dec. 15, 1994, Pat. No. 5,608,903.

[60] Provisional application No. 60/008,671 Dec. 15, 1995.

[51] Int. Cl.$^6$ .................................................... G06F 17/30
[52] U.S. Cl. .......................... 707/10; 707/201; 707/202; 707/203; 707/200; 395/200.31
[58] Field of Search .................. 707/10, 8, 201, 707/202, 203; 395/200.3, 200.31

[56] References Cited

U.S. PATENT DOCUMENTS

| | | | |
|---|---|---|---|
| 5,001,628 | 3/1991 | Johnson et al. | 364/200 |
| 5,032,979 | 7/1991 | Hecht et al. | 364/200 |
| 5,113,519 | 5/1992 | Johnson et al. | 395/600 |
| 5,325,524 | 6/1994 | Black et al. | 395/600 |
| 5,367,698 | 11/1994 | Webber et al. | 395/800 |
| 5,408,619 | 4/1995 | Oran | 395/325 |
| 5,408,657 | 4/1995 | Bigelow et al. | 395/600 |
| 5,418,966 | 5/1995 | Madduri | 395/725 |
| 5,434,974 | 7/1995 | Loucks et al. | 395/200 |
| 5,434,994 | 7/1995 | Shaheen et al. | 395/500 |
| 5,459,860 | 10/1995 | Burnett et al. | 395/600 |
| 5,463,774 | 10/1995 | Jenness | 395/600 |
| 5,491,817 | 2/1996 | Gopal et al. | 395/600 |
| 5,519,855 | 5/1996 | Neeman et al. | 707/1 |
| 5,608,903 | 3/1997 | Prasad et al. | 707/10 |
| 5,613,079 | 3/1997 | Debique et al. | 395/468 |
| 5,677,851 | 10/1997 | Kingdon et al. | 364/514 C |
| 5,689,706 | 11/1997 | Rao et al. | 707/201 |

FOREIGN PATENT DOCUMENTS 95100255  7/1995  European Pat. Off. ........ G06F 17/30

OTHER PUBLICATIONS

"Accessing Files in an Internet: The Jade File System", H. Rao et al., *IEEE Transactions on Software Engineering* vol. 19, No. 6, Jun. 1993, pp. 613–624.

"Exploiting Read–Mostly Workloads in the FileNet File System", D. Edwards et al., *Operating Systems Review* (SIGOPS) 23, 1989, pp. 58–70.

"A Comparison of Two Approaches to Build Reliable Distributed File Servers", A. Bhide et al., *IEEE*, 1991, pp. 616–623.

"Limited Effects of Finite Storage on Beneficial File Migration Policy", R.T. Hurley et al., *IEEE*, 1994, pp. 432–439.

"Managing Personal Files Across Independent File Management Units", M. Mutka et al., *IEEE*, 1992, pp. 254–261.

"Mastering Windows™ 3.1 Special Edition", R. Cowart *SYBEX*, 1992, pp. 132–141.

"Novell's Guide to Netware 4.1 Networks", Author Unknown, Publisher Unknown, Date Unknown, pp. 366–421.

"Performance Study of Client–Server Storage Systems", E. Drakopoulos et al., *IEEE*, 1991, pp. 67–72.

"Performance analysis of Client–Server Storage Systems", E. Drakopoulos et al., *IEEE Transactionsl on Computers*, vol. 41, No. 11, Nov. 1992, pp. 1442–1452.

"Selected Abstracts", No Date.

*Primary Examiner*—Thomas G. Black
*Assistant Examiner*—Hosain T. Alam
*Attorney, Agent, or Firm*—Computer Law++

[57] ABSTRACT

Methods and systems for managing replicated objects in a partitioned hierarchical database are disclosed. One method combines partition-wide object identifiers in order according to ancestry to form a database-wide object identifier that identifies a target object relative to all other objects in the database. Each partition-wide object identifier includes a replica identifier and at least one integer value. Suitable integer values include timestamp values, event counter values, random values, and GUID values. Other methods use the identifiers to access objects after a single object or a subtree of objects has been renamed or moved.

27 Claims, 7 Drawing Sheets

REPLICATED OBJECT IDENTIFICATION IN A PARTITIONED HIERARCHY

This application is a continuation in part of application Ser. No. 357,466 filed Dec. 15, 1994 now U.S. Pat. No. 5,608,903.

RELATED APPLICATIONS

This application is based on commonly owned copending U.S. patent application Ser. No. 60/008,671, filed Dec. 15, 1995, for a Method and Apparatus for Replicated Object Identification in a Partitioned Hierarchy (hereinafter "the '671 application") and on commonly owned copending U.S. patent application, continuation-in-part of Ser. No. 08/357,466, filed Dec. 15, 1994, for a Method and Apparatus for Moving Subtrees in the Distributed Network Directory (hereinafter "the '466 application"), now U.S. Pat. No. 5608,903 issued to Prasad et al.

FIELD OF THE INVENTION

The present invention relates to the management of objects in a distributed digital network, and more particularly to the identification of replicated objects in a replicated hierarchical database that represents resources in a distributed digital network.

TECHNICAL BACKGROUND OF THE INVENTION

The personal computer revolution placed a computer on nearly every desktop and in many other locations. Soon the need arose for these computers to communicate with each other. Network operating systems (NOS) were invented to allow many computers to communicate with each other over a network. Networks now span offices, cities, countries and even the globe. These networks link users, workstations, printers, servers, and other resources. Networks enable users to access resources across the network. Access to these resources helps users accomplish more by making more computing resources available, if the resources can be identified and addressed.

Hierarchical network databases were invented to organize network resources. A hierarchical database resembles a tree, with as many nodes, branches and levels as is needed to describe the network and its resources. The top node of the tree (sometimes called the "root") represents the entire network. The "leaves" of the tree represent network resources, including servers, printers, users, user groups, and so on. The nodes between the root and the leaves can represent different geographic locations served by the network, the different divisions or departments within a corporation, or other useful categories. The hierarchy does not necessarily have to correspond with the physical layout of the network. The nodes and leaves are "objects" in the hierarchical network database.

The hierarchical network database is stored on at least one server computer on the network. However, to avoid a single point of failure, a database copy or replica can be stored on one or more servers on the network. As the network changes and grows this database will increase in size, as will the replicas. Replicas of large network databases are expensive to store and keep updated, so the database is often divided into smaller, more manageable pieces called "partitions." Each partition corresponds to a subtree in the database tree. A database partition is stored on at least one network server; each copy of the partition is called a "replica." Partitioning the hierarchical network database helps reduce maintenance costs by distributing the maintenance across the network, rather than concentrating it on one server.

Within the hierarchical network database, each node and leaf of the tree is associated with a textual identifier. The text in each node identifier reminds users and administrators what portion of the network corresponds to that node. The text in each leaf identifier names a network resource. To name a resource at one of the leaves, one may concatenate the identifiers associated with the nodes along the path leading from the top node of the tree to the leaf. This results in an object identifier known as a "distinguished name," which is unique across the entire network. Distinguished names are used by people and application programs to reference network resources.

However, both networks and the organizations that use them continually change. To reflect changes, the textual identifiers of nodes and leaves are changed. This causes changes in the distinguished names of network resources, but the application programs and users are not necessarily notified about the changes. Any attempt to notify all users and programs about changes in the distinguished names of network resources would be very difficult because instances of a distinguished name can exist in many different forms in the computer systems on the network. The names could be stored in data files, in application programs, or in other databases. Application programs that try to use an outdated distinguished name to access a network resource will fail in their attempt.

A more permanent way of naming objects in the network database, which will survive the renaming of node and leaf identifiers, is needed. This method must also work across all partitions and replicas of the database; the naming method must distinguish between any two objects regardless of where the various copies of each object reside. It would be an advantage if the method also helps to efficiently locate the named object in the database.

One approach gives each object a timestamp identifier. This approach assumes a "central clock" to guarantee a unique timestamp for each object. However, a central clock is difficult to synchronize in a distributed network. Also, this timestamp identifier does not help locate the object in the hierarchical database.

Another approach is to assign each object a fixed length globally unique identifier, or "GUID." GUIDs contain a random or arbitrary portion. For instance, a GUID may contain a pseudo-random number, an arbitrary timestamp, or an address value or serial number assigned by a board manufacturer. As a result, each GUID is statistically very likely to be different. However, the risk still exists that two different objects will be assigned the same GUID, which would cause severe integrity problems in the database. Moreover, GUIDs contain no particular information to help locate an object in the database.

In the Novell NetWare 4.0 network operating system, each object in the hierarchical network database is assigned its own internal identifier which includes a replica number and a timestamp. However, most references to resources in the network database are still made using a distinguished name. This may cause difficulties during replication. Moreover, the internal identifiers are not organized to help locate objects in the database.

Thus, it would be an advancement in the art to provide objects in a hierarchical network database with unique identifiers which survive the updating of the object's distinguished name.

It would be a further advancement to provide such identifiers which also survive the moving of an object within the database.

It would be a further advancement to provide such identifiers which help locate the identified objects in the database.

A method and system providing such identifiers are disclosed and claimed herein.

BRIEF SUMMARY OF THE INVENTION

The present invention provides a novel method and system for assigning and resolving unique object identifiers for replicated objects in a partitioned hierarchical system such as a NetWare Directory Services database ("NDS database").

In one embodiment, the invention operates within a system that includes a hierarchical set of objects where any contiguous subtree of objects may be declared to be a "partition." A partition may exist at more than one location. A partition at a particular location is called a "replica." Each replica is assigned a unique number among the set of replicas of its partition. Each server holds at most one replica of a given partition.

When an object is created within a replica it is assigned a unique identifier relative to its sibling objects, such that no two siblings in any replica of the partition have the same relative identifier. The relative identifier contains its replica number and is therefore guaranteed to be unique among all of the sibling objects created in all replicas of that partition.

The invention provides a complete object identifier for an object by starting with the relative identifier of an object and adding the relative identifier of each ancestor object until the relative identifier of the root of the object hierarchy is added. Such a sequence of relative object identifiers can be used as a global identifier of an object and is referred in one embodiment as a "tuned-name" or an "absolute name." Each relative identifier may also include information, such as the last known relative distinguished name of the object, to aid object location, but all such information is merely used as hints in finding an object. When an object is replicated, it can be identified by its tuned-name. All references that an object has to other objects are also replicated using the tuned-name of the referenced object.

Furthermore, an object can be located efficiently by its tuned-name. The process of locating an object by successively narrowing the range of possible locations is called "name resolution." Since the tuned-name contains the object hierarchy down to the specified object in a manner reminiscent of fully distinguished names, name resolution can follow the object relationships through the distributed hierarchy.

Unlike GUIDs, tuned-names support arbitrary levels of object hierarchy both within the total system and within a replica. The complete sequence of relative identifiers is significant. Moreover, GUIDs may collide. That is, two objects might be identified by the same GUID. By contrast, tuned-names are unique.

The present invention provides several advantages. The entire sequence of relative identifiers allows each tuned-name to be handled in an independent manner. The tuned-name is guaranteed not to conflict with any other tuned-name. By contrast, a GUID is merely unlikely to conflict with another GUID. In addition, an object identified by a tuned-name can be located in a step-by-step fashion starting from any point the object hierarchy. By contrast, GUIDs have no internal structure that can be used to narrow the search for an object from all possible locations.

Tuned-name identifiers may be used when replicating changes to an object. Improved synchronization methods can be obtained from existing methods by using tuned-names in place of other object names or identifiers to identify an object at another location by a series of object identifiers relative to a known object. The entire series of object identifiers may be used not only to locate a base object, but also for replicating references to other objects.

In summary, the present invention provides an alternative way to achieve the functionality provided by GUIDs, such as allowing identification of an object independently of names imposed by users or any other modifiable attribute. But tuned-names also provide additional advantages. Unlike GUIDs, tuned names are truly unique within the database, and tuned names can be resolved to locate objects efficiently in a distributed hierarchical database. Other features and advantages of the present invention will become more fully apparent through the following description.

BRIEF DESCRIPTION OF THE DRAWINGS

To illustrate the manner in which the advantages and features of the invention are obtained, a more particular description of the invention summarized above will be given with reference to the attached drawings. These drawings only provide selected embodiments of the invention and are not therefore to be considered limiting of its scope. In the drawings.

DETAILED DESCRIPTION OF THE PREFERRED EMBODIMENTS

The present invention relates to a method and apparatus for managing replicated objects in a partitioned hierarchical database. The invention is suitable for use on computers connected in a computer network. The computers may be workstations, laptop computers, disconnectable mobile computers, file servers, or a combination thereof. The network may include one or more LANs, wide-area networks, Internet servers and clients, intranet servers and clients, or a combination thereof.

Figure 1:
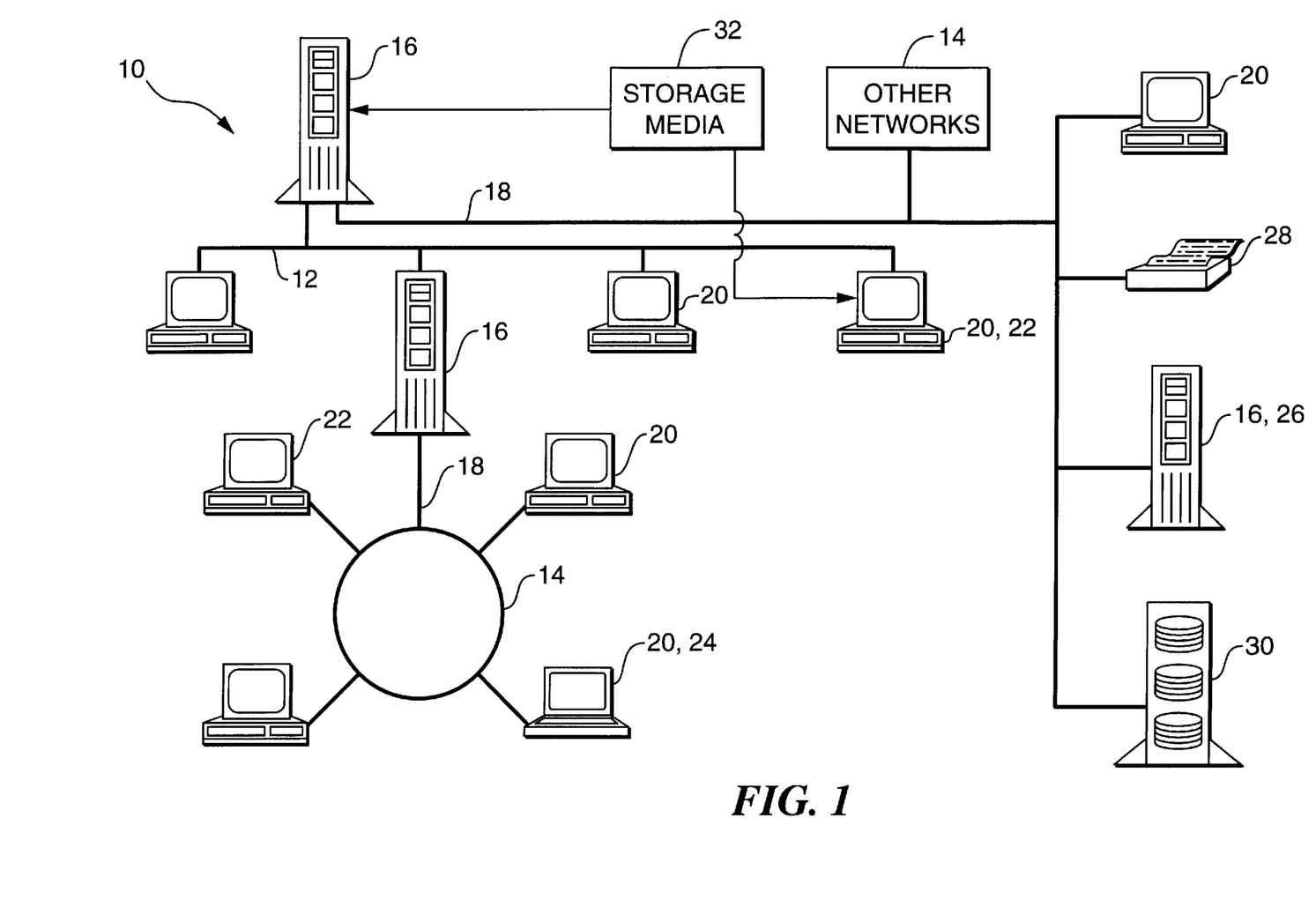
FIG. 1 is a diagram illustrating a computer network suitable for use with the present invention.

One of the many computer networks suited for use with the present invention is indicated generally at 10 in FIG. 1. In one embodiment, the network 10 includes Novell NetWare® network operating system software (NETWARE is a registered trademark of Novell, Inc.) and Novell's NetWare Directory Services software. In alternative embodiments, the network includes NetWare Connect Services, VINES, Windows NT, Windows 95, LAN Manager, or LANtastic network operating system software and an implementation of a distributed hierarchical partitioned object database according to the X.500 protocol (VINES is a trademark of Banyan Systems; NT, WINDOWS 95, and LAN MANAGER are trademarks of Microsoft Corporation; LANTASTIC is a trademark of Artisoft). The network 10 may include a local area network 12 which is connectable to other networks 14, including other LANs or portions of the Internet or an intranet, through a gateway or similar mechanism.

The network 10 includes several file servers 16 that are connected by network signal lines 18 to one or more network clients 20. The file servers 16 and network clients 20 may be configured by those of skill in the art in a wide variety of ways to operate according to the present invention. The file servers 16 may be configured as Internet servers, as intranet servers, as directory services providers or name servers, as software component servers, or as a combination thereof. The servers 16 may be uniprocessor or multiprocessor machines. The servers 16 and clients 20 each include an addressable storage medium such as random access memory or a non-volatile storage medium such as a magnetic disk.

Suitable network clients 20 include, without limitation, personal computers 22, laptops 24, and workstations 26. The signal lines 18 may include twisted pair, coaxial, or optical fiber cables, telephone lines, satellites, microwave relays, modulated AC power lines, and other data transmission "wires" known to those of skill in the art. In addition to the network client computers 20, a printer 28 and an array of disks 30 are also attached to the network 10. Although particular individual and network computer systems and components are shown, those of skill in the art will appreciate that the present invention also works with a variety of other networks and computers.

The file servers 16 and the network clients 20 are capable of using floppy drives, tape drives, optical drives or other means to read a storage medium 32. A suitable storage medium 32 includes a magnetic, optical, or other computer-readable storage device having a specific physical substrate configuration. Suitable storage devices include floppy disks, hard disks, tape, CD-ROMs, PROMs, RAM, and other computer system storage devices. The substrate configuration represents data and instructions which cause the computer system to operate in a specific and predefined manner as described herein. Thus, the medium 32 tangibly embodies a program, functions, and/or instructions that are executable by the file servers 16 and/or network client computers 20 to perform object management steps of the present invention substantially as described herein.

Figure 2:
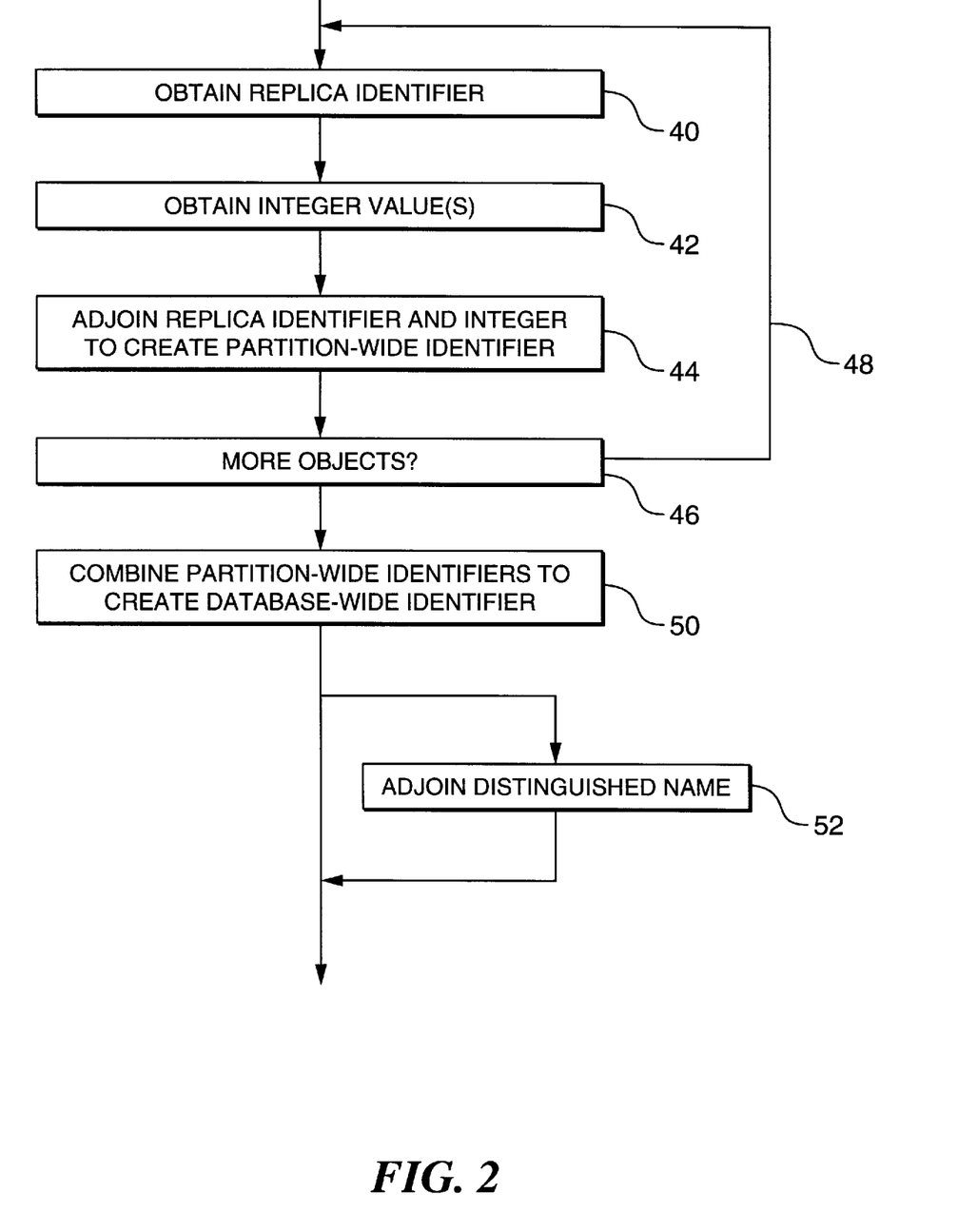
FIG. 2 is a flow chart illustrating a method of the present invention for creating database-wide identifiers.

FIG. 2 illustrates a method of the present invention for managing replicated objects in a partitioned hierarchical database. A database is an organized collection of pieces or groups of information. In a hierarchical database, the information items are organized in a hierarchical structure which is typically called a "tree" (although it is often drawn by programmers as an upside-down tree). The tree includes a root object to which zero or more descendant objects are linked. A "relational" database may be used to represent a tree, but may also represent more complex structures. Each object below the root object may also be viewed as the root of a subtree (which contains only the subtree root if the subtree root has no descendants). Each subtree defines a "partition" of the hierarchical database.

As explained in the '466 application and elsewhere, a copy of a partition stored on a given computer server 16 (FIG. 1) is called a "replica" of the partition. Storing several replicas on different servers 16 in the network 10 helps make the information in the partition more readily available by placing the information close to more users and by reducing the risk that a problem with a server 16 will make the information unavailable.

During a step 40, a replica identifier is obtained. To prevent confusion, each replica on a given server 16 is assigned a replica identifier that distinguishes it from all other replicas of that partition on any server 16. A variety of suitable syntactic and semantic constraints for replica identifiers will be evident to those of skill in the art. One suitable replica identifier is simply a two-byte replica number assigned to the replica when it is created. Replica numbers are assigned sequentially or in some other manner which guarantees that each replica (up to some maximum number of replicas) receives a replica number assigned to no other replica of the partition in question.

During a step 42, at least one integer value is obtained. Suitable integer values are discussed below in connection with FIG. 4.

During a step 44 the replica identifier and the integer value are adjoined to form a partition-wide object identifier which identifies a target object in a partition of the database relative to all other objects in that partition. The simplest means for adjoining two items is to simply store them adjacent one another in the memory (volatile RAM and/or non-volatile memory) of a server 16 and/or client 20 computer. Those of skill in the art will also appreciate that two items can be adjoined in other ways, such as by storing them at a fixed address offset from one another or by linking them with one or more address pointers. In each case, one adjoined item can be readily obtained if the other adjoined item is provided.

With continued reference to FIG. 2, a test 46 is performed to determine whether additional objects are present in the database on a path containing the root object and the target object. As indicated by a loop 48, the steps 40 through 46 are then repeated for each such intervening object. Each repetition of the steps 40–44 creates a partition-wide object identifier for an intervening object. Once all intervening objects have been given a partition-wide identifier, the loop defined by 40–48 is exited.

If more than one intervening object is present, the intervening objects, root object, and target object are preferably processed during turns through the loop "in order according to ancestry." That is, the objects are processed one generation at a time in either top-down order (ancestor first, then descendant) or in bottom-up order (descendant first, then ancestor).

A step 50 combines the partition-wide identifiers of each intervening object with the partition-wide identifiers of the root and target objects to create a database-wide identifier for the target object. The database-wide object identifier identifies the target object relative to all other objects in the database. That is, no two objects in the database have the same database-wide object identifier.

The partition-wide identifiers are preferably combined simply by adjoining them in order according to ancestry, but hey may also be adjoined in some other order, such as according to the creation time of the objects involved, the most recent access time of the objects, the size of the objects, or some other characteristic of the objects.

During an optional step 52, a "distinguished name" may be adjoined to the partition-wide identifiers. The step 52 may also be performed before the step 50. Distinguished names are human-readable textual names assigned by users and/or system administrators to help users navigate through the network 10 (FIG. 1). For instance, in a system using simplified syntax, a distinguished name could look like "PatK.Accounting.WorldOfWidgets", where PatK is a network user in the accounting department of the World of Widgets company. Generally speaking, the database-wide identifiers of the present invention will be used internally by directory services and other network software and by the administrators of the network 10, while the distinguished names will be used by both administrators and other users of the network 10. Note distinguished names can be quite long, requiring substantial space to store all of the distinguished names in even a moderately sized network 10.

Figure 3:
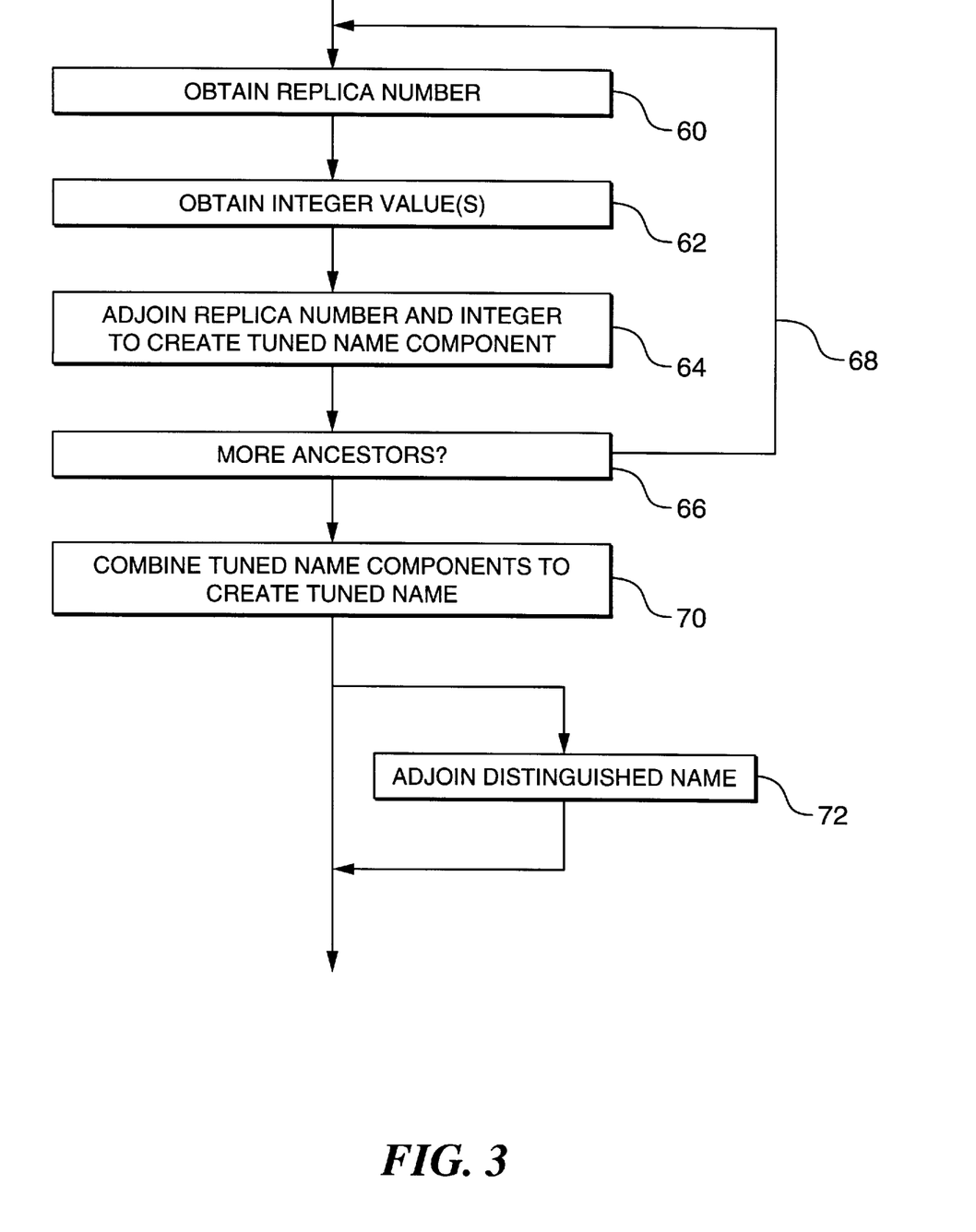
FIG. 3 is a flow chart illustrating a variation of the method shown in FIG. 2, for creating tuned name database-wide identifiers.

FIG. 3 illustrates a particular method of the invention which is based on the more general method just described in connection with FIG. 2. The method of FIG. 3 includes a step 60 of obtaining a replica number, similar to the step 40 of obtaining a replica identifier, but limiting the identifier to a number rather than a name, address, or some other identifier. A step 62, which obtains at least one integer value, will be discussed in connection with FIG. 4

A step 64 adjoins the replica number and the integer(s) obtained during the steps 60, 62 to create a tuned name component. A tuned name component is a particular type of partition-wide identifier which includes a replica number (rather than some other replica identifier) and utilizes adjacent storage in computer memory (rather than offsets or to pointers) to adjoin the replica number with the integer(s) obtained during step 62.

A step 66 checks for ancestors of the target object whose tuned name component has just been created. Thus, a loop 60-68 resembles the loop 40-48 in FIG. 2, but creates tuned name components rather than other partition-wide identifiers, and creates them in bottom-up order from the target object through any intervening objects up to and including the root object.

Figure 4:
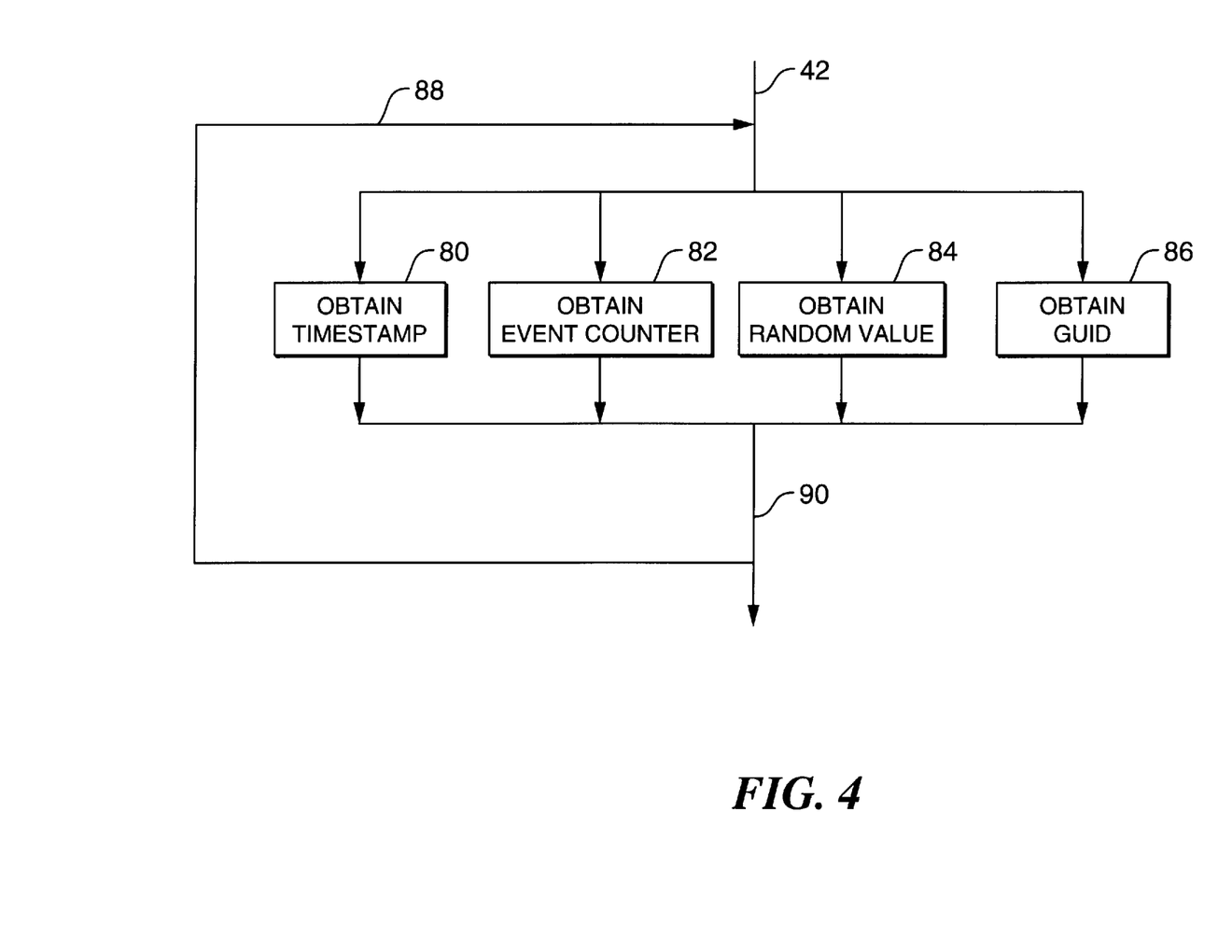
FIG. 4 is a flow chart further illustrating an integer obtaining step shown in FIGS. 2 and 3.

A step 70 combines the tuned name components in order according to ancestry to create a particular kind of database-wide identifier known as a "tuned name." Finally, an optional step 72 allows the tuned name to be adjoined with a corresponding distinguished name. FIG. 4 illustrates in detail the integer-obtaining steps 42, 62 of FIGS. 2 and 3. Each of four integer-obtaining obtaining steps 80–86 will be described, but it should be noted that these steps can be combined with one another by means of a loop 88. Thus, one or more integers may be obtained, using repetitions or combinations of the steps 80–86, before following an exit 90 to the next step 44 or 64, as the case may be.

A timestamp-obtaining step 80 provides an integer in the form of a creation or modification timestamp. In one method, the step 80 provides a four-byte value that represents the UTC time in whole seconds since an origin time of midnight on Jan. 1, 1970. The seconds indicate the time that passed since the origin time before the creation or modification occurred. System calls are available in most computer systems to obtain this or a similar timestamp.

A step 82 obtains an event counter. Unlike timestamp values, which increase in a regular manner corresponding generally to real-world time regardless of activity within the computer system, event counters are updated in response to sporadic or unpredictable (in the sense of when they will occur, not what they will do) events within the computer system. Event counters may be used to distinguish two creation or modification events that occur within the same second and thus have the same timestamp. One method provides a two-byte event counter.

A step 84 obtains a random or pseudo-random value. Such values are generated on demand using a variety of well known methods. Unlike timestamp values and event counter values, a sequence of random values will not generally be ordered by size.

A step 86 provides a "globally unique identifier" or "GUID." For purposes of this invention, a "universally unique identifier" or UUID is interchangeable with a GUID. GUID values are statistically unique. That is, the chance that any finite sequence of GUID values will contain two equal values is very small but not zero. GUID values may or may not be ordered, depending on how they are generated.

Figure 5:
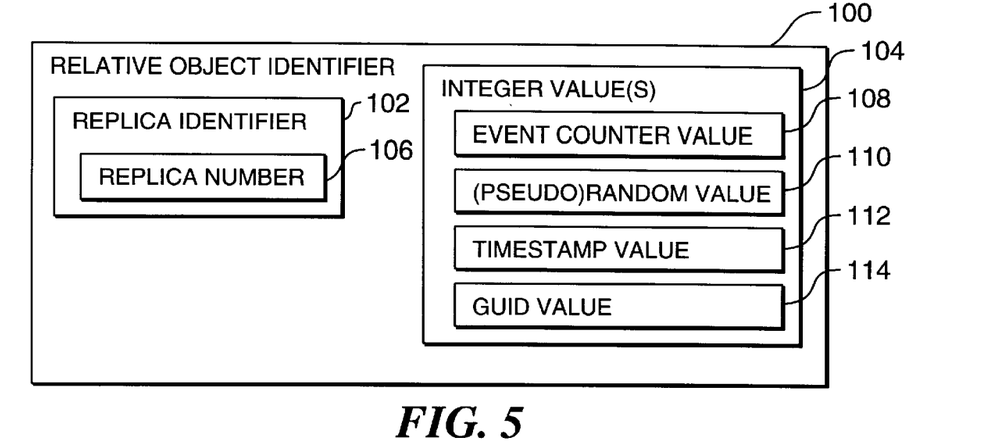
FIG. 5 is a block diagram illustrating embodiments of a relative (partition-wide) object identifier according to the invention.

FIGS. 5 through 8 illustrate structures generated using the methods shown in FIGS. 2 through 4. FIG. 5 shows a relative (partition-wide) object identifier 100. The relative identifier 100 includes at least a replica identifier 102 and a set 104 of one or more integer values. The replica identifier may be a replica number 106 or another identifier, as discussed above in connection with steps 40, 60. The integer values may include one or more instances of an event counter value 108, a random or pseudo-random value 110, a creation, modification or other time-stamp value 112, and a GUID or UUID value 114.

Figure 6:
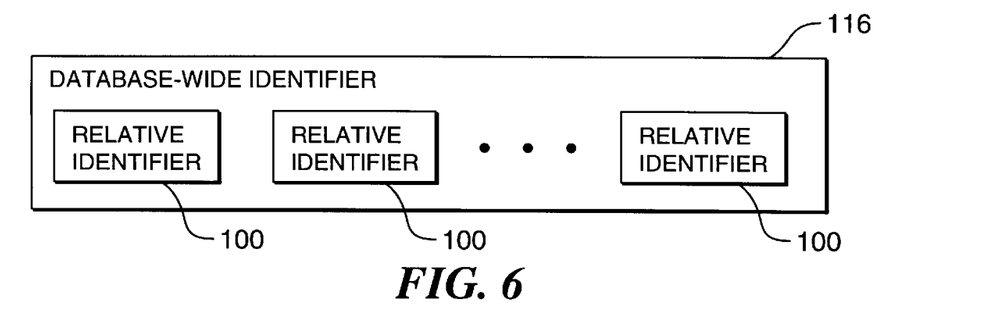
FIG. 6 is a block diagram illustrating embodiments of a database-wide identifier formed from relative identifiers shown in FIG. 5.

As illustrated in FIG. 6, relative identifiers 100 are adjoined to form a database-wide identifier 116. Three relative identifiers 100 are shown, but it will be appreciated that the number of relative identifiers corresponds to the number of objects in the path between the target object and the root object. If the target object is the root object, only one relative identifier 100 will be present in the database-wide identifier 116. If the target object is a child of the root, two relative identifiers 100 will be present. If the target object's parent is a child of the root object, three relative identifiers 100 will be present in the database-wide identifier 116, and so forth.

Figure 7:
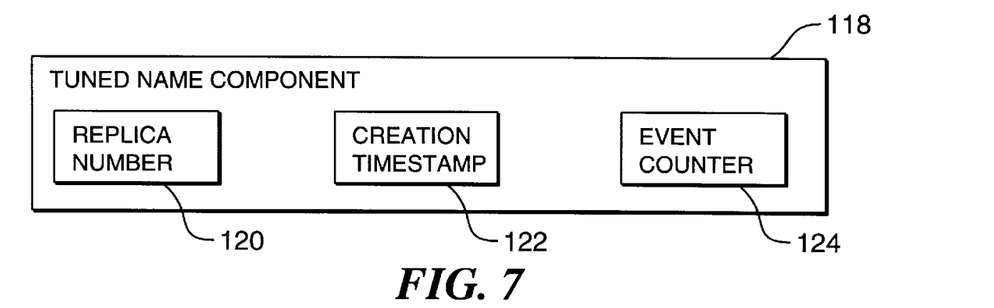
FIG. 7 is a block diagram illustrating embodiments of a tuned name component according to the present invention.
Figure 8:
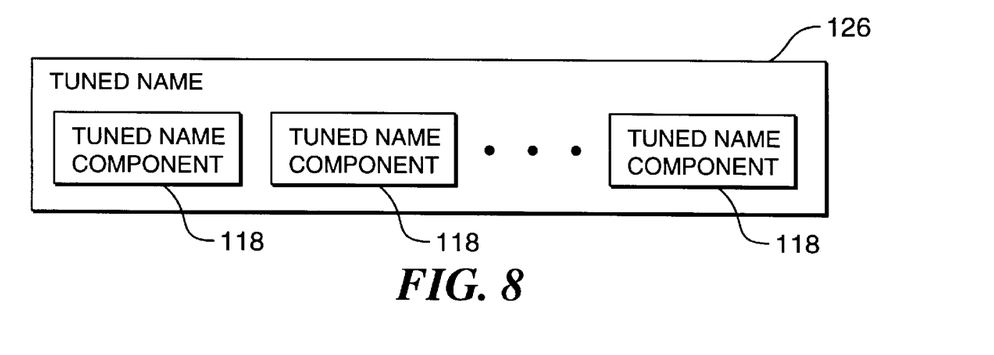
FIG. 8 is a block diagram illustrating embodiments of a tuned name formed from components shown in FIG. 7.

FIGS. 7 and 8 illustrate tuned name embodiments of the structures shown in FIGS. 5 and 6. A tuned name component 118 includes a replica number 120, a creation timestamp 122, and an event counter 124. In one embodiment, the replica number 120 is two bytes long, the timestamp 122 is four bytes long and represents seconds, and the event counter 124 is two bytes long and represents events within a given second. In other embodiments other storage sizes and interpretations of values are employed.

A tuned name 126 includes one or more adjoined tuned name components 118. As noted in describing FIG. 6, the actual number of components 118 will vary according to the number of objects between the target object being named and he root object.

Figure 9:
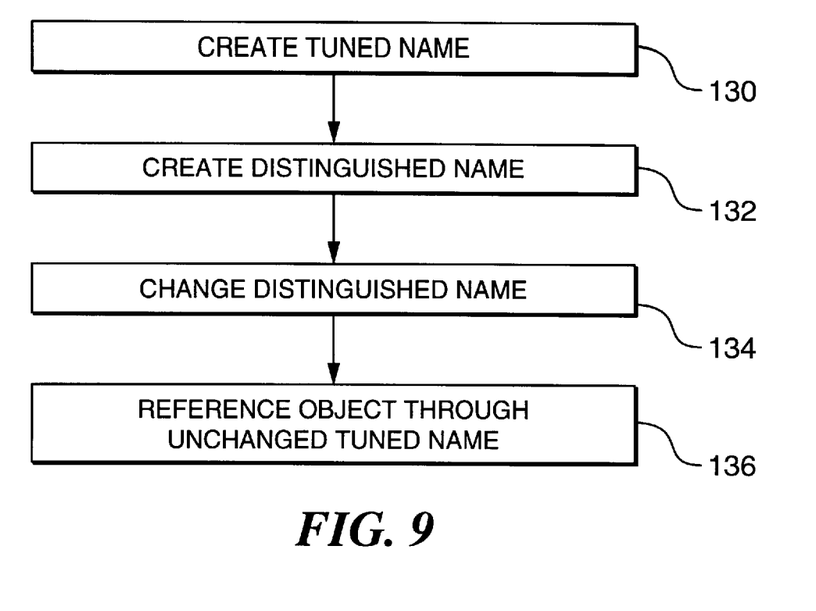
FIG. 9 is a flow chart illustrating a method which references an object using a tuned name.

FIG. 9 illustrates a method of the invention which highlights a difference between tunes names 126 (FIG. 8) and other database-wide identifiers 116 (FIG. 6), on the one hand, and distinguished names, on the other. A target object is "renamed" by changing its distinguished name, but the same tuned name identifies the object before and after the renaming is complete.

During a step 130, a tuned name is created for an object using one of the methods illustrated in FIGS. 2–4. During a step 132, a distinguished name is created for the object using familiar methods. Step 132 may also precede step 130.

During a renaming step 134, the objects distinguished name is changed. For instance, the object associated with PatK might be renamed to "PatEK.Accounting.WorldOf-Widgets". Scripts and other references to the object through the distinguished name must now be updated, event though the object has not moved in relation to other database objects. But, as shown in a step 136, the tuned name of the object still accurately identified the object. Thus, the renamed object can be referenced through the tuned name without requiring any change to that tuned name.

Figure 10:
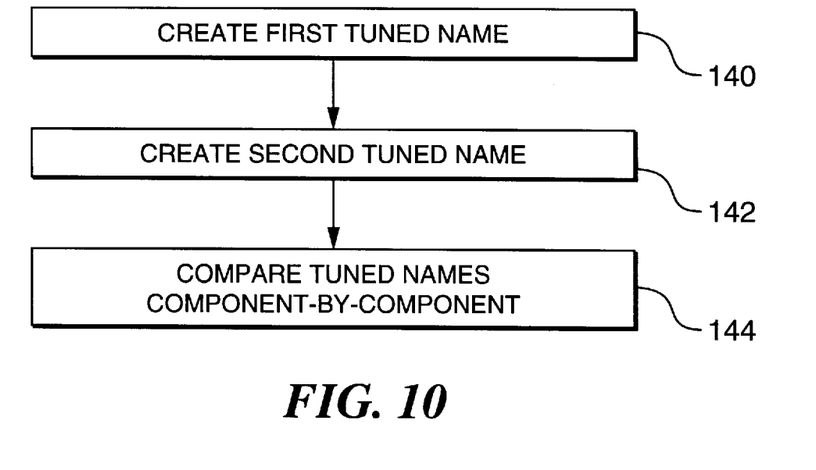
FIG. 10 is a flow chart illustrating a method which compares tuned names.

FIG. 10 illustrates a method for using tuned names to determine whether an object at one location in the network 10 (FIG. 1) is distinct in the user's point of view from an object at another location. The two objects may be instances of the same object in different replicas, or they may represent objects that users distinguish, such as the two objects represented by the two distinguished names "PatK.Accounting.WorldOfWidgets" and "PatK.Sales.WorldOfWidgets".

During a step 140 and a step 142, tuned names 126 (FIG. 8) or other database-wide identifiers 116 (FIG. 6) for the two objects are created according to the methods shown in FIGS. 2–4. The tuned names are then compared, one component at a time, during a step 144. Comparison may proceed in order according to ancestry or in another order, as deemed appropriate by those of skill in the art. If the two names represent different instances of the same object, then one or more replica numbers will differ but the time-stamp and event counter values in corresponding components will be the same. On the other hand, if the objects are distinct, as viewed by database users, then the creation and event counter values will differ somewhere in the two tuned names. Of course, the tuned names of two distinct objects may also contain a different number of components.

Figure 11:
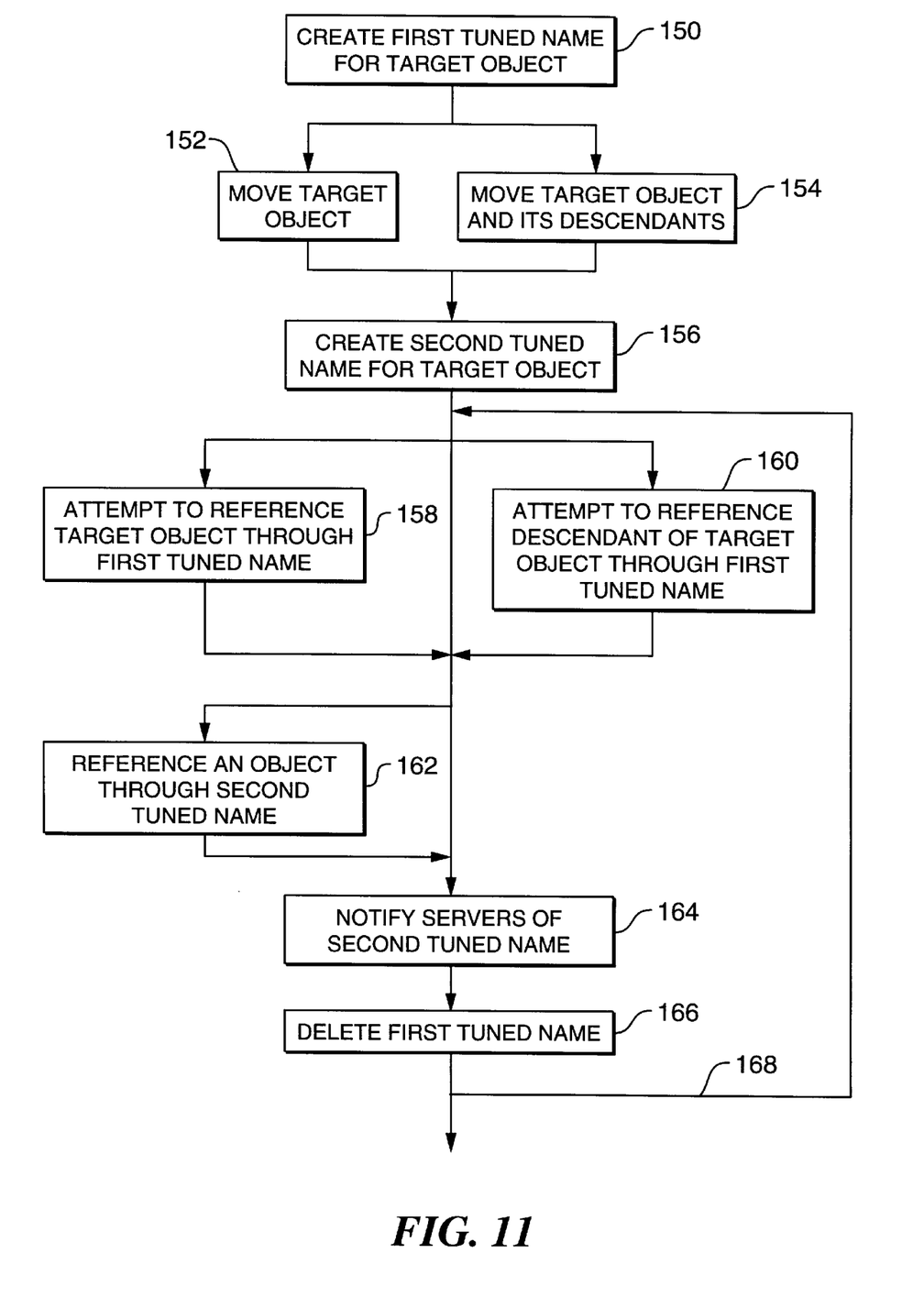
FIG. 11 is a flow chart illustrating a method which moves one or more objects and then references one of the moved objects using a tuned name.

FIG. 11 illustrates methods for using tuned names to manage objects which are moved from one location to another in the database. The move may involve either an individual object or an entire subtree of objects. Unlike the mere renaming illustrated in FIG. 9, movements do require changes to tuned names and other steps shown in FIG. 11.

During a step 150, a first tuned name 126 (FIG. 8) or other database-wide identifier 116 (FIG. 6) is created for the target object that will be moved. Such identifiers are also created for descendants of the target object, and the identifiers are created according to the methods shown in FIGS. 2–4. During a step 152 or a step 154, either the individual target object or the entire subtree rooted at the target object is moved to a new location in the database hierarchy. This may be accomplished using the invention described the '466 application or by other means, such as NWADMIN or commercially available tools.

After the move, a second tuned name is created for the target object, using the methods illustrated in FIGS. 2–4, which reflects the new location of the target object. Note that it is possible but not necessary to similarly create new tuned names for descendants of the target object.

At some point after the move, an attempt is made to reference either the target object itself (step 158) or one of its descendants (step 160) using the original tuned name. Such attempts can be readily detected and redirected to use components or other information from the second tuned name of the target object (the tuned name at the new location). A table of old and new tuned names of moved objects, pointers from old to new tuned names, replacement of old names with new names and use of a bitflag, or other means can be used by those of skill to intercept and redirect attempts to reference moved objects at their previous locations. Accordingly, reference to the target object and/or its descendants proceeds during a step 162.

One or more repetitions of the steps 158–162 may be interleaved, precede, or follow a notifying step 164 and/or a deleting step 166, as suggested by a loop 168. During the step 164, notice of the change in name is propagated from one server 16 to another throughout the network 10 (FIG. 1). After all servers 16 have been notified of the new tuned name of the target object, the old tuned name can be deleted from tables and other internal structures during step 166. The tuned names of descendants any descendants of the target object can be similarly updated, or attempts to reference them through the old location of the target object can be intercepted and redirected as described above.

In summary, the present invention provides a novel approach to managing objects in a replicated hierarchical database. Unlike approaches that rely solely on distinguished names, the present invention does not require updates to object identifiers for mere renames. Unlike approaches that rely solely on GUID values, the present invention does not allow distinct objects to have the same identifier, and provides identifiers which contain structure that corresponds to the location of an object in the database.

Although particular methods embodying the present invention are expressly illustrated and described herein, it will be appreciated that apparatus and article embodiments may be formed according to methods of the present invention. Unless otherwise expressly indicated, the description herein of methods of the present invention therefore extends to corresponding apparatus and articles, and the description of apparatus and articles of the present invention extends likewise to corresponding methods.

The invention may be embodied in other specific forms without departing from its essential characteristics. The described embodiments are to be considered in all respects only as illustrative and not restrictive. Any explanations provided herein of the scientific principles employed in the present invention are illustrative only.

We claim:

1. A method for managing replicated objects in a partitioned hierarchical database which includes a root object, comprising the steps of:

(a) obtaining a replica identifier which identifies a replica in the database relative to other replicas in the database;

(b) obtaining an integer value;

(c) adjoining the replica identifier and the integer value to form a partition-wide object identifier which identifies a target object in a partition of the database relative to all other objects in that partition;

(d) repeating the steps (a)–(c) for each object in the replica which is on a path containing the root object and the target object, thereby creating at least one additional partition-wide object identifier; and (e) combining the partition-wide object identifier of the target object with the partition-wide object identifiers of the objects on the path to form a database-wide object identifier which identifies the target object relative to all other objects in the database.

2. The method of claim 1, wherein the combining step comprises placing the partition-wide object identifiers adjacent one another in order according to ancestry as components in the database-wide object identifier.

3. The method of claim 1, wherein the step of obtaining an integer value comprises obtaining a timestamp value.

4. The method of claim 1, wherein the step of obtaining an integer value comprises obtaining an event counter value.

5. The method of claim 1, wherein the step of obtaining an integer value comprises obtaining a random value.

6. The method of claim 1, wherein the step of obtaining an integer value comprises obtaining a GUID value.

7. A method for managing replicated objects in a partitioned hierarchical database having a plurality of writable replicas, comprising the steps of:

(a) obtaining a replica number which identifies a particular writable replica in the database relative to other replicas in the database;

(b) obtaining an event counter;

(c) adjoining the replica number and the event counter to form a tuned name component which identifies a target object in a partition of the database relative to all other objects in that partition;

(d) repeating the steps (a)–(c) for each object in the particular replica which is an ancestor of the target object, thereby creating at least one additional tuned name component; and (e) adjoining the tuned name components created by steps (a)–(d) in order according to ancestry, thereby forming a tuned name which identifies the target object relative to all other objects in the database.

8. The method of claim 7, wherein the target object is identified by a distinguished name in addition to being identified by the tuned name.

9. The method of claim 8, wherein the method further comprises renaming the target object by changing the distinguished name, and the same tuned name identifies the object before and after the renaming is complete.

10. The method of claim 7, wherein the steps (a)–(e) provide a first tuned name, and the method further comprises comparing the first tuned name with a second tuned name by comparing tuned name components one-by-one in order according to ancestry.

11. The method of claim 7, wherein the steps (a)–(e) provide a first tuned name, and the method further comprises moving the target object to a different location in the database and then repeating the steps (a)–(e) to create a second tuned name which identifies the target object at the different location.

12. The method of claim 11, wherein each replica is stored on a server computer and the method further comprises notifying each server computer of the second tuned name and then deleting the first tuned name from the database.

13. The method of claim 7, wherein the steps (a)–(e) provide a first tuned name which identifies the target object at a first location in the database, the target object has at least one descendant object in the database, and the method further comprises moving the target object and all its descendant objects from a first set of locations to a second set of locations in the database and then repeating the steps (a)–(e) to create a second tuned name which identifies the target object at its second location.

14. The method of claim 13, wherein the method further comprises the steps of:

attempting to access a descendant object of the target object at its first location using a first tuned name of the descendant object;

detecting that the descendant object has been moved; and then accessing the descendant object at its second location by replacing a first tuned name component in the first tuned name of the descendant object by a tuned name component in the second tuned name of the descendant object, the first tuned name component identifying the target object at its first location and the second tuned name component identifying the target object at its second location.

15. A system for managing objects, the system comprising:

at least one server computer having an addressable storage medium configured by containing at least one replica of a partitioned hierarchical database of objects, the server storage medium being further configured by containing a server program capable of responding to requests for access to the database;

at least one client computer in communication with the server computer through a network connection, the client computer having an addressable storage medium configured by containing an application program capable of making requests for access to the database;

means for adjoining replica identifiers and integer values to form a sequence of relative object identifiers;

wherein at least one object in the partitioned hierarchical database is identified to the server program by the sequence of relative object identifiers, the sequence corresponds to the object and its ancestor objects, and each relative object identifier identifies an object relative to its sibling objects within the replica of the database on the server.

16. The system of claim 15, wherein each relative object identifier comprises a replica number and an integer value that is an event counter value or a random value.

17. The system of claim 15, wherein each relative object identifier comprises a replica number, an event counter value, and a timestamp value.

18. The system of claim 15, wherein each relative object identifier comprises a replica number and a GUID value.

19. The system of claim 15, further comprising means for accessing an object using a sequence of relative object identifiers after the object has been moved to a different location in the database.

20. The system of claim 15, further comprising means for accessing an object using a sequence of relative object identifiers after the object and at least one ancestor of the object have been moved together to a different location in the database.

21. A computer-readable storage medium having a configuration that represents data and instructions which cause a computer system to perform method steps for managing replicated objects in a partitioned hierarchical database, the method steps comprising the following:

(a) obtaining a replica identifier which identifies a replica in the database relative to other replicas in the database;

(b) obtaining an integer value;

(c) adjoining the replica identifier and the integer value to form a partition-wide object identifier which identifies a target object in a partition of the database relative to all other objects in that partition;

(d) repeating the steps (a)–(c) for each object in the replica which is an ancestor of the target object, thereby creating at least one additional partition-wide object identifier; and (e) combining the partition-wide object identifier of the target object with the partition-wide object identifiers of the ancestors of the target object to form a database-wide object identifier which identifies the target object relative to all other objects in the database.

22. The storage medium of claim 21, wherein the combining step comprises placing the partition-wide object identifiers adjacent one another in order according to ancestry as components in the database-wide object identifier.

23. The storage medium of claim 21, wherein the step of obtaining an integer value comprises obtaining a timestamp value.

24. The storage medium of claim 21, wherein the step of obtaining an integer value comprises obtaining an event counter value.

25. The storage medium of claim 21, wherein the step of obtaining an integer value comprises obtaining a GUID value.

26. The storage medium of claim 21, wherein each partition-wide object identifier comprises a replica number, an event counter value, and a timestamp value.

27. The storage medium of claim 21, wherein the method further comprises accessing an object using a partition-wide object identifier after the object has been moved to a different location in the database.

* * * * *